(12) United States Patent
Seo (10) Patent No.: US 12,477,265 B2
(45) Date of Patent: Nov. 18, 2025

(54) PORTABLE AUDIO DEVICE

(71) Applicant: LG ELECTRONICS INC., Seoul (KR)

(72) Inventor: Ilho Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 18/031,459

(22) PCT Filed: Apr. 20, 2021

(86) PCT No.: PCT/KR2021/004935
§ 371 (c)(1),
(2) Date: Apr. 12, 2023

(87) PCT Pub. No.: WO2022/080612
PCT Pub. Date: Apr. 21, 2022

(65) Prior Publication Data
US 2023/0379615 A1   Nov. 23, 2023

(30) Foreign Application Priority Data

Oct. 12, 2020 (KR) .................. 10-2020-0130945

(51) Int. Cl.
*H04R 1/10*   (2006.01)
*G06F 3/01*   (2006.01)

(52) U.S. Cl.
CPC .......... *H04R 1/1041* (2013.01); *G06F 3/017* (2013.01); *H04R 2201/107* (2013.01)

(58) Field of Classification Search
CPC .................... H04R 1/1041; G06F 3/017
See application file for complete search history.

(56) References Cited

U.S. PATENT DOCUMENTS

| | | | |
|---|---|---|---|
| 2012/0045994 A1* | 2/2012 | Koh | H04W 12/02 455/41.3 |
| 2020/0314526 A1* | 10/2020 | Lee | H04R 29/001 |
| 2020/0342878 A1* | 10/2020 | Lee | H04M 1/6066 |
| 2021/0125609 A1* | 4/2021 | Dusan | G10L 25/84 |
| 2022/0086555 A1* | 3/2022 | Narisawa | H04R 1/1066 |

FOREIGN PATENT DOCUMENTS

| | | |
|---|---|---|
| JP | 2007-121694 A | 5/2007 |
| KR | 10-1330476 B1 | 11/2013 |
| KR | 10-2017-0115480 A | 10/2017 |
| KR | 10-1802764 B1 | 11/2017 |
| KR | 10-1803308 B1 | 11/2017 |

* cited by examiner

*Primary Examiner* — Simon King
(74) *Attorney, Agent, or Firm* — Birch, Stewart, Kolasch & Birch, LLP (57) ABSTRACT

A portable audio device including a first earphone unit and a second earphone unit according to an embodiment of the present disclosure, wherein the first earphone unit comprises:
a communication unit an audio output unit configured to output an audio signal received through the communication unit; a microphone; a sensor unit configured to detect a wearing state of the first earphone unit; and a processor configured to set the first earphone unit to a microphone mode when the first earphone unit is detected as a non-wearing state.

20 Claims, 8 Drawing Sheets

PORTABLE AUDIO DEVICE

CROSS REFERENCE TO RELATED APPLICATIONS

This application is the National Phase of PCT International Application No. PCT/KR2021/004935, filed on Apr. 20, 2021, which claims priority under 35 U.S.C. 119 (a) to Patent Application No. 10-2020-0130945, filed in Republic of Korea on Oct. 12, 2020, all of which are hereby expressly incorporated by reference into the present application.

TECHNICAL FIELD

The present disclosure relates to a portable audio device that is electrically connected to a terminal and plays audio.

BACKGROUND ART

A portable audio device refers to an audio reproducing device that receives audio data from a terminal and transmits audio data collected through a microphone to the terminal.

In the past, a wired method of receiving audio data by inserting an ear jack of a terminal into a terminal was used for a portable audio device, but recently, the demand for a wireless communication type portable audio device is explosively increasing in consideration of the convenience of movement.

Research and development of portable audio devices considering portability and convenience, such as a headphone method that is worn in a band shape on the head to be carried on the user's body and a method that is hung or inserted on the ear, is increasing.

Meanwhile, as the portable audio device is provided with a microphone, it is possible for the user to speak while wearing the portable audio device. At this time, a case where the user uttered a small audio such as a whisper also occurred, depending on the location, performance, and surrounding environment of the microphone provided in the portable audio device, there was a problem that the portable audio device could not properly receive voice data of a small audio such as a user's whisper.

DISCLOSURE

Technical Problem

An object of the present disclosure is to detect the user's non-wearing of the first earphone unit and to adjust the microphone setting of the first earphone in response to the user's non-wearing of the first earphone unit by using a sensor provided in a portable audio device including a first earphone unit and a second earphone unit.

An object of the present disclosure is to receive a microphone use request from a terminal connected to a portable audio device, and to detect the user's non-wearing of the first earphone to adjust a microphone setting of the first earphone unit.

Technical Solution

A portable audio device including a first earphone unit and a second earphone unit according to an embodiment of the present disclosure, wherein the first earphone unit comprises: a communication unit; an audio output unit configured to output an audio signal received through the communication unit; a microphone; a sensor unit configured to detect a wearing state of the first earphone unit; and a processor configured to set the first earphone unit to a microphone mode when the first earphone unit is detected as a non-wearing state.

Also, the second earphone unit comprises: a communication unit; an audio output unit configured to output an audio signal received through the communication unit; a microphone; and a processor configured to set the first earphone unit to a voice reception mode when the first earphone unit is set the microphone mode.

Also, the microphone mode includes mode for controlling turn-on the microphone of the first earphone unit.

Also, the microphone mode is a mode further including controlling off the audio output unit of the first earphone unit.

Also, the sensor unit of the first earphone unit detects the wearing state using at least one of a proximity sensor, an acceleration sensor, a motion sensor, a gyro sensor, or a conduction sensor.

Also, the sensor unit of the first earphone unit includes a proximity sensor and the processor of the first earphone unit, when it is detected that the information obtained through the proximity sensor of the first earphone unit deviated from a preset distance, determines that the first earphone unit is in the non-wearing state.

Also, the sensor unit of the first earphone unit includes a motion sensor and the processor of the first earphone unit, when a gesture corresponding to the reception of a voice signal through the first earphone unit is detected through the motion sensor of the first earphone unit, determines that the first earphone un the non-wearing state.

Also, the processor of the first earphone unit, sets the first earphone unit to the microphone mode when the non-wearing state of the first earphone unit is maintained for a predetermined time or longer.

Also, the processor of the first earphone unit, when the non-wearing state of the first earphone unit is maintained for the predetermined time or longer and the first earphone unit is not in a charging state, sets the first earphone unit to the microphone mode.

Also, the communication unit of the first earphone unit and the communication unit of the second earphone unit communicates with a terminal, and the processor of the first earphone unit, when a microphone use request is received from the terminal, sets the first earphone unit to the microphone mode.

Also, the microphone use request requested from the terminal includes at least one of changing application settings of the terminal, requesting microphone activation in an application, outgoing a call, and receiving a call.

Also, the processor of the first earphone unit transmits an audio signal input through the microphone of the first earphone unit to a terminal, and the processor of the second earphone unit outputs an audio signal received from the terminal using the audio output unit of the second earphone unit.

A system including a portable audio device including a first earphone unit and a second earphone unit and a terminal according to an embodiment of the present disclosure, wherein the terminal communicates with the portable audio device to transmit and receive an audio signal, the portable audio device, when a non-wearing state of the first earphone unit is detected, sets the first earphone unit to a microphone mode and sets the second earphone unit to a voice reception mode.

Also, the portable audio device, when it is detected that the information obtained through the proximity sensor of the first earphone unit deviated from a preset distance, determines that the first earphone unit is in the non-wearing state.

Also, the portable audio device, when a gesture corresponding to the reception of a voice signal through the first earphone unit is detected through the motion sensor of the first earphone unit, determines that the first earphone unit is the non-wearing state.

Also, the portable audio device, sets the first earphone unit to the microphone mode when the non-wearing state of the first earphone unit is maintained for a predetermined time or longer and the first earphone unit is not in a charging state.

Also, the terminal requests a microphone use request to the portable audio device to microphone, and the microphone use request requested from the terminal includes at least one of changing application settings of the terminal, requesting microphone activation in an application, outgoing a call, and receiving a call.

A method of operating a portable audio device including a first earphone unit and a second earphone unit, according to an embodiment of the present disclosure, comprising: receiving an audio signal from a terminal; detecting a non-wearing state of the first earphone unit; and setting the first earphone unit to a microphone mode and setting the second earphone unit to a voice reception mode.

Also, the detecting the non-wearing state of the first earphone unit comprises: detecting that information obtained through a proximity sensor of the first earphone unit deviate from a predetermined distance, or detecting a gesture corresponding to receiving a voice signal through the first earphone unit through the motion sensor of the first earphone unit.

Also, the method further comprising: after detecting the non-wearing state of the first earphone unit, when the first earphone unit is not in a charging state, setting the first earphone unit to the microphone mode.

Advantageous Effects

According to the present disclosure, it is possible to detect the user's non-wearing of the first earphone unit using a sensor provided in a portable audio device, such as when the user holds the first earphone unit in his hand and speaks.

According to the present disclosure, when the non-wearing state of the first earphone unit is detected, voice data uttered by a user in a low voice can be effectively received by adjusting a microphone setting of the first earphone unit.

According to the present disclosure, when the first earphone unit is set to the microphone mode, audio data transmitted from the terminal can be completely output by setting the worn second earphone unit to the voice reception mode.

BEST MODE

Hereinafter, details of the present invention will be described.

The embodiment described below is only one example of the present invention, and the present invention can be modified in various forms. Accordingly, the specific structures and functions disclosed below do not limit the scope of the claims.

Hereinafter, the embodiments disclosed in this specification will be described in detail with reference to the accompanying drawings, but the same or similar elements are given the same reference numerals regardless of reference numerals, and redundant description thereof will be omitted. The suffixes "module" and "unit" for components used in the following description are given or used together in consideration of ease of writing the specification, and do not have meanings or roles that are distinct from each other by themselves. In addition, in describing the embodiments disclosed in this specification, if it is determined that a detailed description of a related known technology may obscure the gist of the embodiment disclosed in this specification, the detailed description thereof will be omitted. In addition, the accompanying drawings are only for easy understanding of the embodiments disclosed in this specification, the technical idea disclosed in this specification is not limited by the accompanying drawings, and all changes included in the spirit and technical scope of the present disclosure, it should be understood to include equivalents or substitutes.

Terms including ordinal numbers, such as first and second, may be used to describe various components, but the components are not limited by the terms. These terms are only used for the purpose of distinguishing one component from another.

It is understood that when an element is referred to as being "connected" or "connected" to another element, it may be directly connected or connected to the other element, but other elements may exist in the middle. It should be. On the other hand, when an element is referred to as "directly connected" or "directly connected" to another element, it should be understood that no other element exists in the middle.

Figure 1:
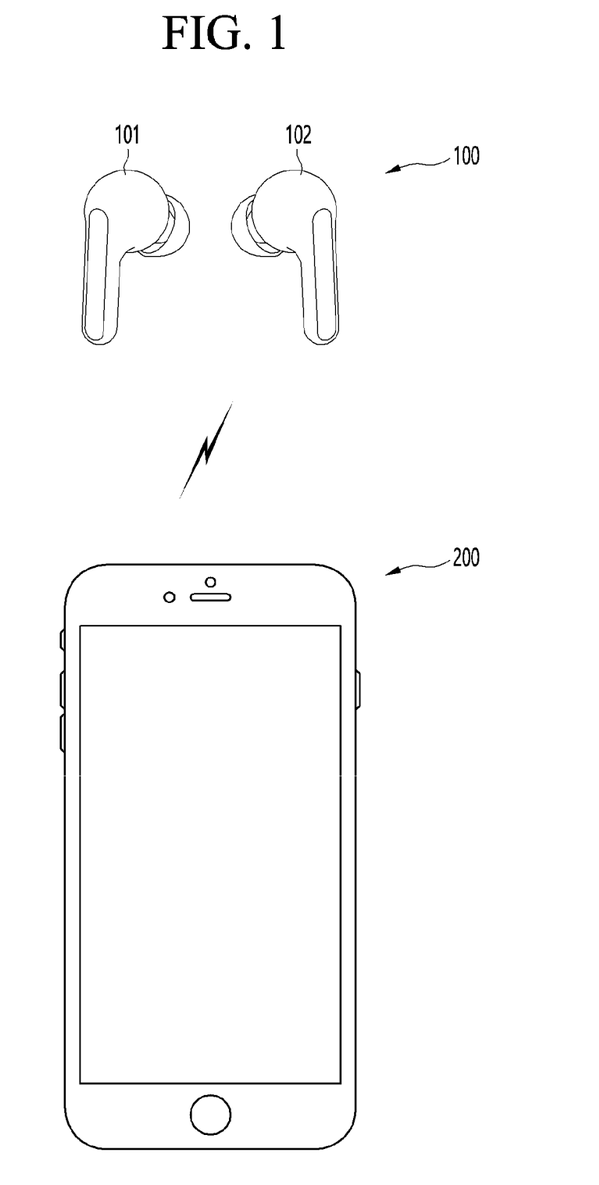
FIG. 1 is a diagram illustrating a system of a terminal and a portable audio device according to an embodiment of the present disclosure.

FIG. 1 is a diagram illustrating a system of a terminal and a portable audio device according to an embodiment of the present disclosure.

FIG. 1 is a view showing an example of an audio reproducing apparatus or a portable audio device 100 connected to a terminal 200, for example, a wireless audio system 1 of a portable audio device including a pair of earphone units 101 and 102.

The portable audio device 100 may be capable of wireless communication with the terminal 200.

In detail, the portable audio device 100 is an audio device capable of wirelessly receiving and listening to music or radio broadcasting played on the terminal 200 while worn on the user's ear.

The user wears a single earphone of any one of the wireless earphones 101 and 102, for example, the first earphone 101 or the second earphone 102, or the first earphone 101 and the second earphone and audio data can be received through one or both of the earphone units 101 and 102, and audio received through this may be reproduced.

According to an embodiment of the present disclosure, audio data may be monophonic, and in this case, each of the first earphone unit 101 and the second earphone unit 102 may receive the same audio data.

In another embodiment, the audio data may be stereophonic, and each of the first earphone unit 101 and the second earphone unit 102 may receive different audio data corresponding to the left channel and the right channel.

In addition, each of the first earphone unit 101 and the second earphone unit 102 may reproduce data obtained by mixing stereophonic audio data and monophonic audio data.

According to an embodiment of the present disclosure, a pair of earphone units 101 and 102 may be simultaneously connected to the terminal 200. Also, any one of the pair of earphones (for example, the first earphone unit 101) may be used as a master audio device, and the other may be used as a slave audio device.

In this case, the terminal 200 may transmit and receive audio data by communicating with the master audio device, and the master audio device and the slave audio device may communicate with each other to transmit and receive audio data.

The slave audio device may communicate with the terminal 200 through the master audio device. That is, the slave audio device and the terminal 200 are connected through the master audio device, and audio data can be transmitted and received with the slave audio device terminal.

In one embodiment, when the portable audio device 100 operates as a group, the terminal 200 may be connected to each earphone unit and individually transmit an audio signal to each earphone unit to output audio.

On the other hand, in the above embodiment, the terminal 200 may be a smart phone device, and for those skilled in the art, it will be appreciated to include a desktop computer, a laptop computer, a tablet computer, a smart phone, a smart watch, a hybrid device, a wearable device such as a glass.

In addition, the portable audio device 100 including a pair of earphones can communicate with each other through any available wireless communication protocol, including wireless communication protocols and standards-based wireless communication protocols such as Bluetooth, Wi-Fi, and the like.

In FIG. 1, a pair of earphone units 101 and 102 are shown, but this is merely an example, and it should be interpreted as including all any number of wired or wirelessly connected audio playback device, including any type of wired or wireless audio headset.

Figure 2:
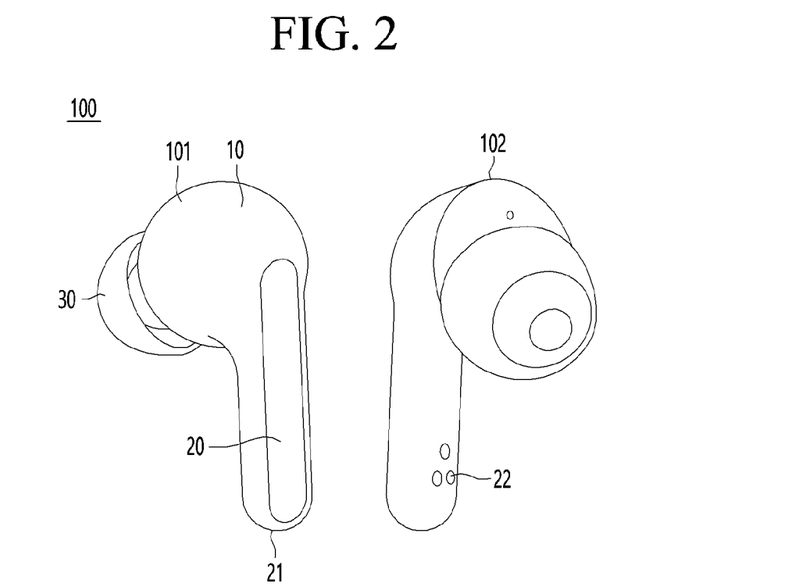
FIG. 2 is a configuration diagram illustrating a first earphone unit and a second earphone unit of a portable audio device according to an embodiment of the present disclosure.

FIG. 2 is a configuration diagram illustrating a first earphone unit and a second earphone unit of a portable audio device according to an embodiment of the present disclosure.

Referring to FIG. 2, the external appearance of the portable audio device 100 is schematically as follows. Referring to FIG. 2, each of the first earphone unit 101 and the second earphone unit 102 included in the portable audio device 100 may include a head unit 10, in-ear unit 30 is inserted into the user's ear from the head unit 10 and is in contact with a part of the user's body and a body unit 20 that is connected to the head unit 10.

The in-ear unit 30 may protrude from one side of the head unit 10, and the material of the in-ear unit 30 may be made of a cushion material such as silicon to provide a user with a comfortable fit.

The body unit 20 may have a stick shape protruding from one side of the head unit 10.

A microphone for receiving user and other audio signal may be provided at one end of the body unit 20. The microphone may serve to receive the user's speech.

In addition, a charging terminal is provided on the side of the body unit 20 so that the charging terminal can come into contact with the charger when charging the earphone unit.

The head unit 10 may have a speaker hole through which received audio data is output to the outside. A sensor unit including a proximity sensor, a touch pad, and the like as well as a microphone may be provided at one side of the head unit 10.

Hereinafter, the control structure of the portable audio device 100 having the above external structure will be described in detail using a block diagram. Some of the components disclosed in the block diagram presented below may not be clearly shown in the exploded view of the portable audio device disclosed in FIG. 2.

However, it should be noted that all components disclosed only in block diagrams are provided in the form of modules or electrical elements on a circuit board installed in the head unit or body unit of portable audio devices according to an embodiment of the present invention, or are components can be electrically connected to the circuit board in the form of separate part or elements.

Figure 3:
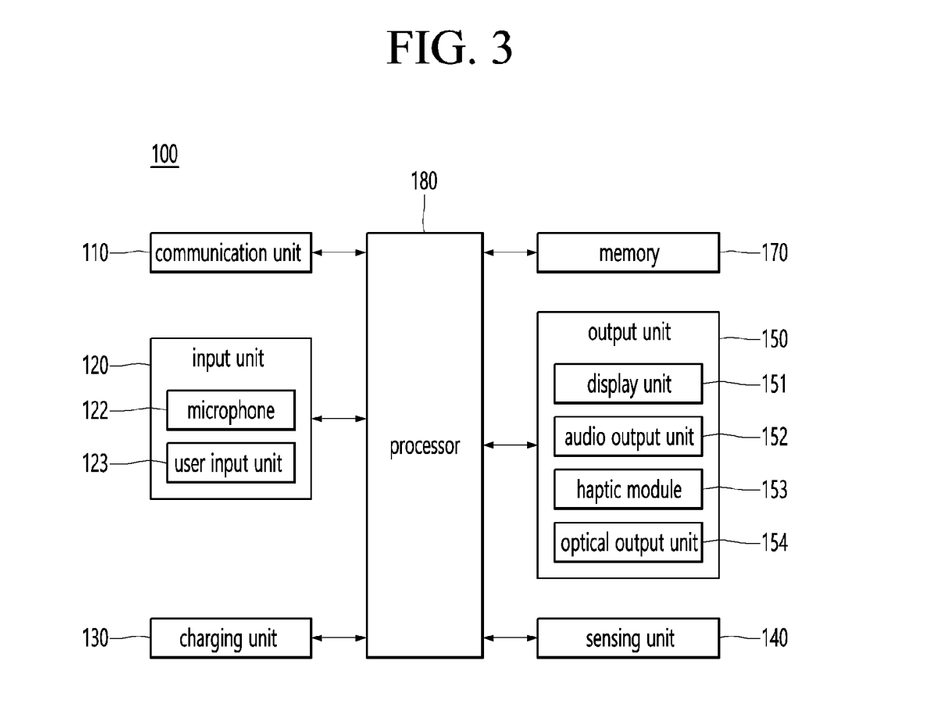
FIG. 3 is a diagram illustrating the configuration of a portable audio device according to an embodiment of the present disclosure.

FIG. 3 is a diagram illustrating the configuration of a portable audio device according to an embodiment of the present disclosure.

Referring to FIG. 3, the portable audio device 100 may include a communication unit 110, an input unit 120, a charging unit 130, a sensing unit 140, an output unit 150, a memory 170, a processor 180 and the like.

The communication unit 110 may also be referred to as a communication modem or a communication circuit.

The communication unit 110 may transmit/receive data with external devices such as the wireless audio device 300 using wired/wireless communication technology. For example, the communication unit 110 may transmit/receive sensor information, a user input, a learning model, a control signal, and the like with external devices.

Communication technologies used by the communication unit 110 include Global System for Mobile communication (GSM), Code Division Multi Access (CDMA), Long Term Evolution (LTE), 5G, Wireless LAN (WLAN), Wireless-Fidelity (Wi-Fi), There are Bluetooth, Radio Frequency Identification (RFID), Infrared Data Association (IrDA), ZigBee, Near Field Communication (NFC), and the like.

The input unit 120 may be referred to as an input interface.

The input unit 120 may acquire various types of data.

The input unit 120 may include a microphone 122 for receiving audio data, a user input unit 123 for receiving information from a user, and the like. Here, the microphone 122 is treated as a sensor, and a signal obtained from the microphone 122 may be referred to as sensing data or sensor information.

Audio data collected by the input unit 120 may be analyzed and processed as a user's control command.

The input unit 120 may obtain raw input data. In this case, the processor 180 may perform pre-processing on the audio data and then transmit the audio data to another terminal through the communication unit.

The microphone 122 processes external sound signal into electrical voice data. The processed voice data may be utilized in various ways according to the function (or application program being executed) being performed in the terminal 100.

Meanwhile, various noise cancellation algorithms may be applied to the microphone 122 to remove noise generated in the process of receiving an external sound signal.

The user input unit 123 is for receiving information from a user. When information is input through the user input unit 123, the processor 180 can control the operation of the portable audio device 100 to correspond to the input information.

The user input unit 123 may include a mechanical input means (example, a button located on the front/rear or side of the portable audio device 100, a dome switch, a jog wheel, a jog switch, etc.) and a touch input means. For example, the touch input means is composed of a virtual key, soft key, or visual key displayed on the touch screen through software processing, or a touch key is disposed on a part other than the touch screen.

The charging unit 130 may perform to manage power of the portable audio device 100.

In detail, the charging unit 130 may be provided in each of at least one earphone unit included in the portable audio device 100 to supply power to each earphone unit. The charging unit 130 may include a battery and may be charged with energy supplied through a charging terminal provided at one end of the earphone unit.

The charging terminal of the charging unit 130 may supply power to the battery by being connected to a charger to which power is supplied.

Meanwhile, the processor 180 may stop the operation of the input unit 120 and the output unit 150 when the charging unit 130 determines that the portable audio device 100 is in a charging state that the charging terminal is contacted with the charger.

The sensing unit 140 may be referred to as a sensor unit or a sensor.

The sensing unit 140 may obtain at least one of internal information of the portable audio device 100, surrounding environment information of the portable audio device 100, and user information by using various sensors.

Sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, lidar, radar and the like.

The output unit 150 may be referred to as an output interface.

The output unit 150 may generate an output related to sight, hearing, or touch. The output unit 150 may include at least one of a display unit 151, a audio output unit 152, a haptic module 153, and an optical output unit 154.

The display unit 151 displays (outputs) information processed by the portable audio device 100. For example, the audio output unit 152 may output audio data received from the communication unit 110 or stored in the memory 170 in a call signal reception, a call mode, a recording mode, a voice recognition mode, or a broadcast reception mode.

The audio output unit 152 may include at least one of a receiver, a speaker, and a buzzer.

A haptic module 153 generates various tactile effects that a user can feel. A representative example of the tactile effect generated by the haptic module 153 may be vibration.

The optical output unit 154 outputs a signal for notifying the occurrence of an event using light from a light source of the portable audio device 100.

Meanwhile, the portable audio device 100 may receive an event generated in the terminal 200 and output an output corresponding to the event.

Examples of events occurring in the terminal 200 may include message reception, call transmission/reception signal reception, missed calls, alarms, schedule notifications, e-mail reception, information reception through applications, and other audio information reception.

The memory 170 may store data supporting various functions of the portable audio device 100.

The processor 180 may control overall operations of the portable audio device 100.

The audio signal processed by the processor 180 may be output as audio to the audio output unit 152. Also, the voice signal processed by the processor 180 may be input to an external output device through an external device interface unit (not shown).

The processor 180 may perform the determined operation by controlling components of the portable audio device 100. To this end, the processor 180 may request, search, receive, or utilize data in the memory 170, and control components to execute a predicted operation or an operation determined to be desirable among the at least one executable operation.

The processor 180 may generate a control signal for controlling the external device and transmit the generated control signal to the external device when the connection of the external device is required to perform the determined operation.

The processor 180 may obtain intent information for a user input and determine a user's requirement based on the acquired intent information.

Furthermore, the processor 180 may combine and operate two or more of the components included in the portable audio device 100 to drive the application program.

Meanwhile, the portable audio device 100 shown in FIG. 3 is merely an embodiment of the present disclosure, and some of the illustrated components may be integrated, added or omitted depending on specification of the portable audio device 100 that is actually implemented.

In one embodiment, the portable audio device 100 has been described as a single configuration, but each of at least one earphone unit (example, a first earphone unit and a second earphone unit) included in the portable audio device 100 may include components shown in FIG. 3.

In addition, the functions performed in each block are for explaining an embodiment of the present disclosure, and the specific operation or device does not limit the scope of the present disclosure.

Figure 4:
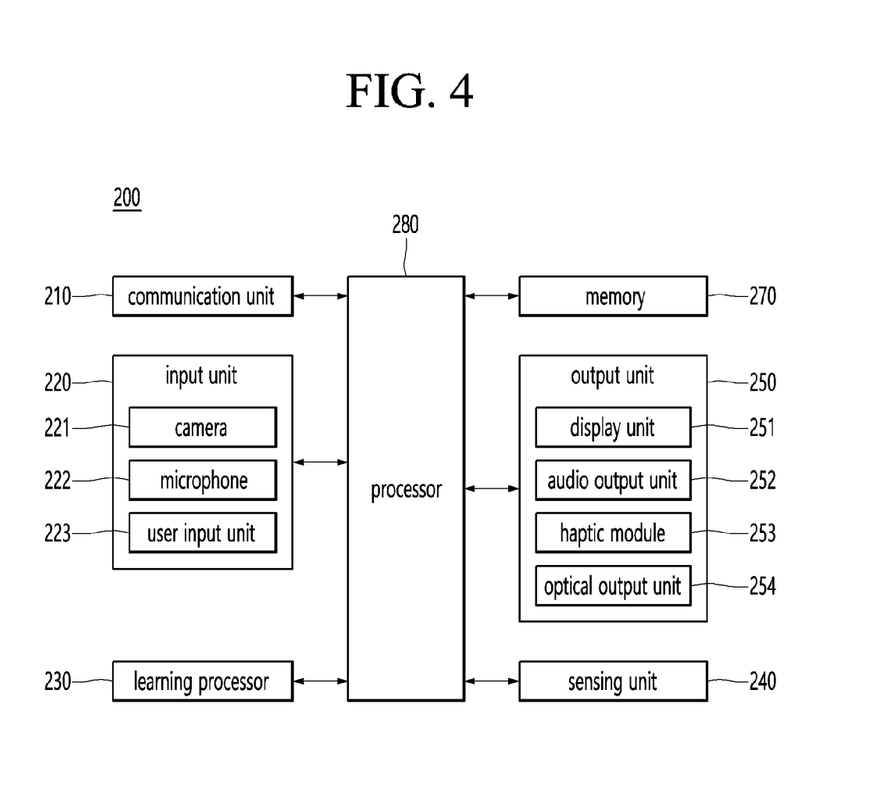
FIG. 4 is a diagram illustrating a configuration diagram of a terminal according to an embodiment of the present disclosure.

FIG. 4 is a diagram illustrating a configuration diagram of a terminal according to an embodiment of the present disclosure.

Referring to FIG. 4, the terminal 200 may include a communication unit 210, an input unit 220, a learning processor 230, a sensing unit 240, an output unit 250, a memory 270, a processor 280, and the like. In this way, the terminal 200 of FIG. 4 may include a configuration similar to that of the portable audio device 100 of FIG. 3, and redundant descriptions will be omitted or briefly described.

The communication unit 210 may also be referred to as a communication modem or a communication circuit.

The communication unit 210 may transmit/receive data with external devices such as the portable audio device 100 using wired/wireless communication technology. For example, the communication unit 210 may transmit/receive sensor information, a user input, a learning model, a control signal, and the like with external devices.

Communication technologies used by the communication unit 210 include Global System for Mobile communication (GSM), Code Division Multi Access (CDMA), Long Term Evolution (LTE), 5G, Wireless LAN (WLAN), Wireless-Fidelity (Wi-Fi), There are Bluetooth, Radio Frequency Identification (RFID), Infrared Data Association (IrDA), ZigBee, Near Field Communication (NFC), and the like.

The input unit 220 may be referred to as an input interface.

The input unit 220 may include a camera 221 for inputting a video signal, a microphone 222 for receiving an audio signal, and a user input unit 223 for receiving information from a user. Here, the camera 221 or the microphone 222 is treated as a sensor, and a signal obtained from the camera 221 or the microphone 222 may be referred to as sensing data or sensor information.

Voice data or image data collected by the input unit 220 may be analyzed and processed as a user's control command.

The input unit 220 may obtain learning data for model learning and input data to be used when obtaining an output using the learning model. The input unit 220 may obtain raw input data, and in this case, the processor 280 or the learning processor 230 may extract input features as preprocessing of the input data.

The camera 221 processes an image frame such as a still image or a moving image obtained by an image sensor in a video call mode or a photographing mode. The processed image frame may be displayed on the display unit 251 or stored in the memory 270.

The user input unit 223 is for receiving information from a user, when information is input through the user input unit 223, the processor 280 may control the operation of the terminal 200 to correspond to the input information.

The learning processor 230 may learn a model composed of an artificial neural network using training data. Here, the learned artificial neural network may be referred to as a learning model. The learning model may be used to infer a result value for new input data other than learning data, and the inferred value may be used as a basis for a decision to perform a certain operation.

The learning processor 230 may perform AI processing together with a learning processor (not shown) of an artificial intelligence server (not shown).

The learning processor 230 may include memory integrated or implemented in the terminal 200. Alternatively, the learning processor 230 may be implemented using the memory 270, an external memory directly coupled to the terminal 200, or a memory maintained in an external device.

The sensing unit 240 may be referred to as a sensor unit or a sensor.

The sensing unit 240 may obtain at least one of internal information of the terminal 200, surrounding environment information of the terminal 200, and user information by using various sensors.

Sensors included in the sensing unit 240 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, lidar, and radar.

The output unit 250 may be referred to as an output interface.

The output unit 250 may generate an output related to sight, hearing, or touch. The output unit 250 may include at least one of a display unit 251, an audio output unit 252, a haptic module 253, and an optical output unit 254.

The display unit 251 displays (outputs) information processed by the terminal 200. For example, the display unit 251 may display execution screen information of an application program driven in the terminal 200 or UI (User Interface) and GUI (Graphic User Interface) information according to such execution screen information.

The display unit 251 may implement a touch screen by forming a mutual layer structure or integrally with the touch sensor. Such a touch screen may function as a user input unit 223 providing an input interface between the terminal 200 and the user and provide an output interface between the terminal 200 and the user.

The memory 270 may store data supporting various functions of the terminal 200. For example, the memory 270 may store input data obtained from the input unit 120, learning data, a learning model, a learning history, and the like.

The processor 280 may control overall operation of the terminal 200.

The image signal processed by the processor 280 may be input to the display unit 251 and displayed as an image corresponding to the corresponding image signal. Also, an image signal processed by the processor 280 may be input to an external output device through an external device interface unit (not shown).

The audio signal processed by the processor 280 may be output as audio to the audio output unit 252. Also, the voice signal processed by the processor 280 may be input to an external output device through an external device interface unit (not shown) or the portable audio device 100.

The processor 280 may control at least some of the components of the terminal 200 in order to drive an application program stored in the memory 270. Furthermore, the processor 280 may combine and operate two or more of the components included in the terminal 200 to drive the application program.

Hereinafter, the operation of the portable audio device 100 of the present disclosure will be described.

Figure 5:
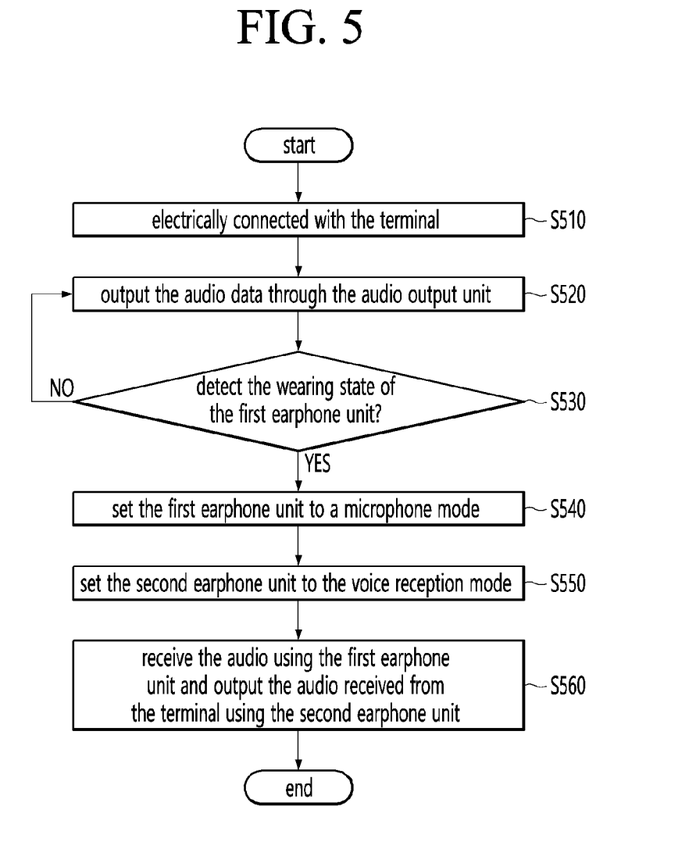
FIG. 5 is a flowchart illustrating a flowchart according to an embodiment of the present disclosure.

FIG. 5 is a flowchart illustrating a flowchart according to an embodiment of the present disclosure.

As described above, the portable audio device 100 according to an embodiment of the present disclosure may include a first earphone unit 101 and a second earphone unit 102.

At this time, '_1' is added to each component included in the first earphone unit 101, and '_2' is added to each component included in the second earphone unit 102. It should be noted that the '_1' and '_2' are given for convenience in order to describe an embodiment of the present disclosure.

Referring to FIG. 5, the terminal 200 and the portable audio device 100 may be electrically connected (S510).

Specifically, the terminal 200 may communicate with a plurality of earphone units (for example, a first earphone unit and a second earphone unit) included in the portable audio device 100.

At this time, among the plurality of earphones, the first earphone unit 101 may be set as a master audio device, and the second earphone unit 102 may be set as a slave audio device.

The first earphone unit 101 set as the master audio device may communicate with the second earphone unit 102 and the terminal 200 using the communication unit 110_1. Also, the first earphone unit 101 may transmit at least a part of audio data received from the terminal 200 to the second earphone unit 102.

The second earphone unit 102 may output audio data received from the first earphone unit 101 through the communication unit 110_2 through the audio output unit 152_2. In addition, the first earphone unit 101 may output at least a part of the audio data received from the terminal 200 through the audio output unit 152_1 (S520).

According to an embodiment of the present disclosure, each sensor unit of the plurality of earphone units (for example, the first earphone unit and the second earphone unit) included in the portable audio device may detect the wearing state of the user's earphone unit (S530).

Specifically, the sensor unit provided in each of the plurality of earphone units may detect whether each corresponding earphone unit is worn on the user's ear by using at least one of a proximity sensor, a motion sensor, an acceleration sensor, a gyro sensor, or a conduction sensor.

More specifically, the sensor unit of the earphone unit may obtain a distance between the earphone unit and a part of the user's body using a proximity sensor. When the processor of the earphone unit detects that the acquired information deviate from a preset distance, the processor of the earphone unit may determine that the corresponding earphone unit is not worn.

Also, the sensor unit of the earphone unit may detect a specific gesture using a motion sensor. When the specific gesture detected through the motion sensor is a gesture corresponding to receiving a voice signal through the earphone unit, the processor may determine that the corresponding earphone unit is not worn.

In addition, the sensor unit of the earphone unit may use an acceleration sensor to determine that the earphone unit is not worn when the earphone unit moves beyond a preset acceleration, and it is also possible to judge by the non-wearing state of the corresponding earphone unit if the earphone unit is tilted more than a preset degree by using the gyro sensor.

In addition, if it is determined that the earphone unit is not in contact with the user's skin using the conduction sensor, the corresponding earphone unit may be determined to be in a non-wearing state.

Hereinafter, the earphone unit detected in the non-wearing state will be described as the first earphone unit 101, and the earphone unit in the user-wearing state will be named and described as the second earphone unit 102 as an example.

When the processor 180_1 of the first earphone unit 101 detects that the first earphone unit is not worn, the processor 180_1 of the first earphone unit 101 may set the first earphone unit 101 to a microphone mode (S540).

And, when the first earphone unit 101 is set to the microphone mode, the processor 180_2 of the second earphone unit 102 may set the second earphone unit to the voice reception mode (S550).

Specifically, the microphone mode may include a mode for controlling (activating) the microphone of the first earphone unit 101 to be turned on. Also, the microphone mode may include a mode of controlling (deactivating) the audio output unit 152_1 of the first earphone unit.

The voice reception mode may include a mode in which the microphone 122_2 of the second earphone unit is off-controlled and a mode in which the audio output unit 152_2 of the second earphone unit is maintained in an on-control (activated) state.

For example, when a user of the portable audio device 100 needs to speak in a low voice, such as a whisper, if the user speaks while wearing the earphone unit in the ear, the user's voice signal may not be accurately received by the microphone of the earphone unit.

In order to solve the above problem, there is a case that the user speeches the first earphone unit 101 of the plurality of earphones while holding it in his hand or bringing it close to his mouth, and listens to an audio signal received from a terminal through the second earphone unit 102 among a plurality of earphone units.

The first earphone unit 101 may determine the non-wearing state through the sensor unit 140_1 as in S530.

When the processor 180_1 of the first earphone unit detects that the non-wearing of the first earphone unit, the processor 180_1 may set the first earphone unit to the microphone mode and activate the microphone of the first earphone unit.

At this time, the processor 180_1 of the first earphone unit may deactivate the audio output unit 152_1 of the first earphone unit. Since the audio output unit 152_1 of the first earphone unit is deactivated, input of an audio signal output from the first earphone unit through the activated microphone 122_1 of the first earphone unit may be prevented.

The processor 180_2 of the second earphone unit may set the second earphone unit to a voice reception mode and keep the audio output unit 152_2 of the second earphone unit active.

At this time, the first earphone unit 101 set to the microphone mode may be set as a master audio device. In addition, the second earphone unit 102 set to the voice reception mode may be set as a slave audio device.

According to an embodiment of the present disclosure, when the first earphone unit 101 and the second earphone unit 102 output an audio signal while being worn on the user's ears, the second earphone unit 102 is a master audio device and the first earphone unit 101 may be a slave audio device. In this case, when the first earphone unit 101 is detected as not being worn, the first earphone unit 101 may be set as the master audio device. At the same time that the first earphone unit 101 is set as the master audio device, the second earphone unit 102 may be set as the slave audio device.

At this time, when the audio signals previously being output from the audio output units 152_1 and 152_2 of the first earphone unit 101 and the second earphone unit 102 are stereophonic and different audio signals are being reproduced, when the second earphone unit 102 is set to the voice reception mode, the terminal 200 may support the audio output unit 152_2 of the second earphone unit to output monophonic type single-channel audio data.

Alternatively, the terminal 200 may support mixing and outputting an audio signal output from the audio output unit 152_1 of the first earphone unit and an audio signal output from the audio output unit 152_2 of the second earphone unit.

When the user detaches the first earphone unit 101 from the ear and brings it close to the mouth that speeches the audio signal or the device that generates the audio signal, the microphone of the first earphone unit is activated so that the audio signal can be effectively received.

In addition, by deactivating the audio output unit 152_1 of the first earphone unit, it is possible to prevent an audio noise signal received through the microphone 122_1 of the first earphone unit from being generated.

Meanwhile, according to an embodiment of the present disclosure, the processor 180_1 of the first earphone unit may set the first earphone unit 101 to the microphone mode when the non-wearing state of the first earphone unit is for a predetermined period of time or longer.

In addition, when the non-wearing state of the first earphone unit 101 is maintained for a predetermined time or more and the first earphone unit 101 is not in a charging state, it is also possible to set the first earphone unit to the microphone mode.

For example, while listening to music transmitted from the terminal 200 using the portable audio device 100, the user simply attaches or detaches the first earphone unit 101 without intending to utter a voice, or the first earphone unit 101 for charging.

At this time, when the first earphone unit 101 is detected as not being worn by the data obtained using the sensor unit as in S530 and the first earphone unit 101 is set to the microphone mode, the microphone of the first earphone unit is unintentionally activated 122_1 may be turned on.

To prevent this, when the non-wearing state of the first earphone unit 101 is maintained for a predetermined time or more, the first earphone unit 101 may be set to a microphone mode.

In addition, when the non-wearing state of the first earphone unit 101 is maintained for a predetermined time or longer and the first earphone unit 101 is not in a charging state, the first earphone unit 101 may be set to the microphone mode.

Specifically, when the first earphone unit 101 is not in a charging state, the charging unit 130_1 of the first earphone unit 101 is in an inactive state, that is, it can mean a case where the charging terminal of the first earphone unit 101 is not physically or electrically connected or contacted.

According to an embodiment of the present disclosure, after the first earphone unit 101 is set to the microphone mode and the second earphone unit 102 is set to the voice reception mode (S540 and S550), the processor 180_1 of the first earphone unit transmits an audio signal input through the microphone 122_1 of the first earphone unit to the terminal 200, and the processor 180_2 of the second earphone unit may output the audio signal received from the terminal 200 using the audio output unit 152_2 of the second earphone unit (S550).

When the second earphone unit 102 is set to an audio signal mode, the processor 180_2 of the second earphone unit may output monophonic audio data received from the terminal 200 or audio data mixed with the audio signal through the audio output unit 152_2.

Through the above process, the user may input a voice signal of a small sound like a whisper to the portable audio device 100 using the first earphone unit 101 that is not worn, and transmit/receive audio data to the outside through the terminal 200.

Meanwhile, there is a case where a specific event occurs in the terminal 200 and the microphone needs to be activated. Hereinafter, the embodiment of FIG. 6 shows an embodiment when a specific event occurs in the terminal 200 and a microphone use request is received.

Figure 6:
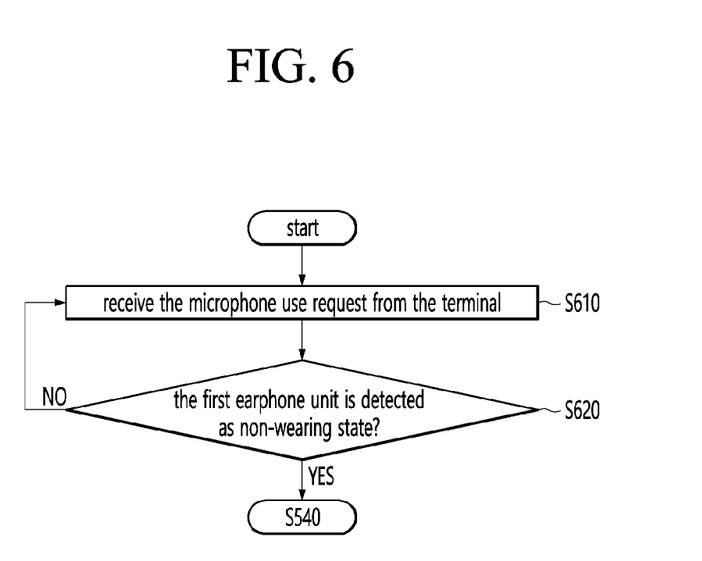
FIG. 6 is a flowchart illustrating a flowchart according to an embodiment of the present disclosure.

FIG. 6 is a flowchart illustrating a flowchart according to an embodiment of the present disclosure.

Referring to FIG. 6, the first earphone unit 101 and the second earphone unit 102 may output audio data received from the terminal 200 using the respective audio output units 152_1 and 152_2 (S520).

At this time, the terminal 200 may request a microphone use request of the portable audio device 100.

The portable audio device 100 receives the microphone use request from the terminal 200 (S610), and may set the earphone unit detected as the non-wearing state among the plurality of earphone units to the microphone mode.

Specifically, when receiving the microphone use request from the terminal 200, the portable audio device 100 may detect a non-wearing state of each of the plurality of earphone units according to S530 described with reference to FIG. 5.

In this case, when the first earphone unit 101 is detected as non-wearing state (S620—YES), the processor 180_1 of the first earphone unit may set the first earphone unit to the microphone mode (S540).

In addition, the remaining earphone units different from the first earphone unit 101 may be set to a voice reception mode. The processor 180_1 of the first earphone unit transmits the audio signal input through the microphone 122_1 of the first earphone unit to the terminal 200, and the processor 180_2 of the second earphone unit may output the audio signal received from the terminal 200 using the audio output unit 152_2 of the second earphone unit (S550 and S560).

Specifically, the microphone use request requested from the terminal 200 may include at least one of a change in application setting of the terminal 200, a request to activate the microphone in the application, and outgoing or receiving a call.

Specific examples will be described with reference to FIGS. 9 to 10.

Figure 7:
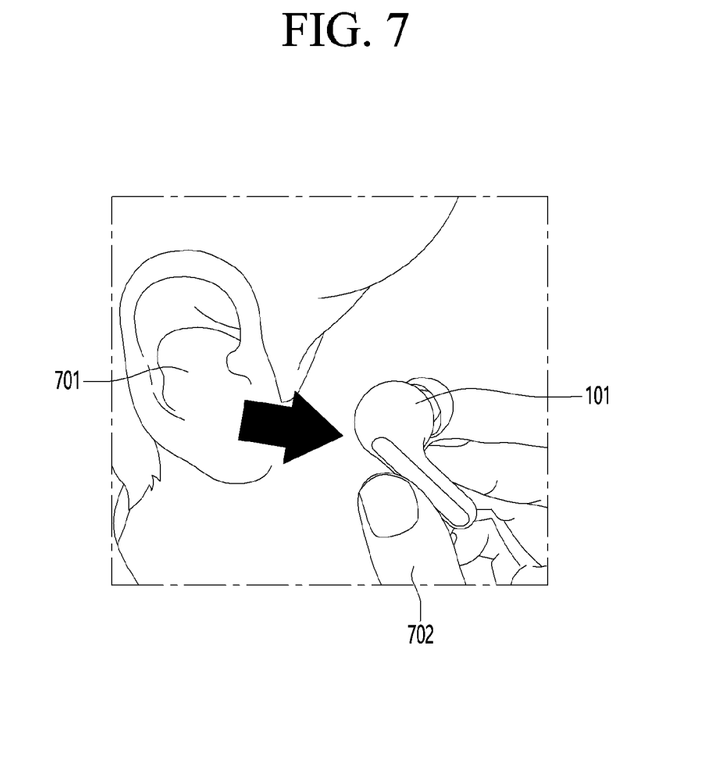
FIG. 7 is a view for explaining wearing and non-wearing of a first earphone unit according to an embodiment of the present disclosure.
Figure 8:
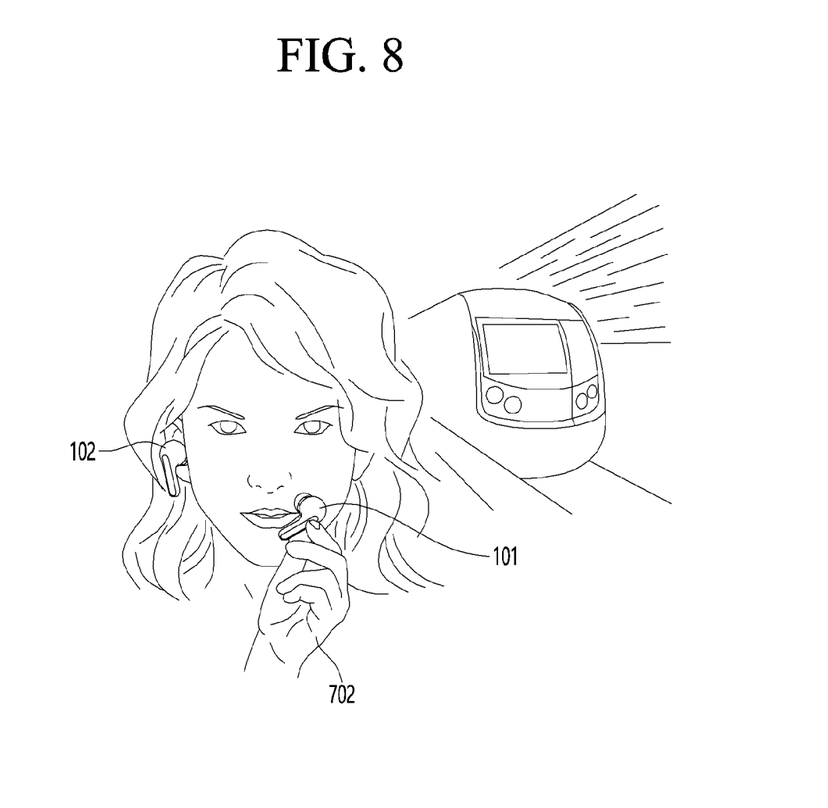
FIG. 8 is a diagram illustrating a user speech scenario according to an embodiment of the present disclosure.

FIG. 7 is a view for explaining wearing and non-wearing of a first earphone unit according to an embodiment of the present disclosure. FIG. 8 is a diagram illustrating a user speech scenario according to an embodiment of the present disclosure.

Hereinafter, a specific example of determining the non-wearing state of the earphone unit in the portable audio device 100 including the first earphone unit 101 and the second earphone unit 102 in FIGS. 7 and 8 will be described.

First, the first earphone unit 101 and the second earphone unit 102 may be worn on the user's ears. The sensor unit 140_1 of the first earphone unit 101 may detect a wearing state of the first earphone unit 101.

At this time, when the first earphone unit 101 is detached from the user's body due to an action such as the user holding the first earphone unit 101 with the hand 702, the first earphone unit may detect the non-wearing state of the first earphone unit by using the sensor unit 140_1.

According to an embodiment of the present disclosure, first, the sensor unit 140_1 of the first earphone unit may obtain a distance between the earphone unit and a part of the user's body (for example, inside the ear 710) using a proximity sensor.

When the processor 180_1 of the first earphone unit detects that the acquired information deviate from a preset distance, the processor 180_1 of the first earphone unit may determine that the corresponding earphone unit is not worn. In general, when the user attaches or detaches the first earphone unit from the body, the distance between the user's body and the first earphone unit generally increases, so that the first earphone unit may detect the non-wearing state of the first earphone unit through the above method.

Second, according to an embodiment of the present disclosure, the sensor unit 140_1 of the first earphone unit may detect a specific gesture using a motion sensor.

The processor 180_1 of the first earphone unit may determine that the corresponding earphone unit is not worn when the specific gesture detected through the motion sensor is a gesture corresponding to receiving a voice signal through the earphone unit.

For example, referring to FIG. 8, the first earphone unit 101 worn on the user's body (for example, ear 701) may be moved around the user's mouth by a specific gesture generated by a hand 702.

The processor 180_1 of the first earphone unit 101 may determine that the first earphone unit is non-wearing state, if a movement from the vicinity of the user's ear 701 to the vicinity of the mouth is detected using the motion sensor and the corresponding gesture is corresponded to a voice receiving signal through the first earphone unit 101.

According to an embodiment of the present disclosure, the motion sensor may recognize a user's specific gesture according to the movement of the earphone unit, and it may be possible to detect the user's specific gesture using a gyroscope sensor and an acceleration sensor.

Thirdly, according to an embodiment of the present disclosure, the sensor unit 140_1 of the first earphone unit may determine that the corresponding earphone unit is non-wearing state if the earphone unit moves in excess of a preset acceleration using an acceleration sensor, and may determine that the earphone part is non-wearing state if the earphone part is inclined more than a predetermined degree by using a gyro sensor.

For example, as shown in FIG. 7 or 8, when the user quickly attaches or detaches the first earphone unit 101 in contact with the body, the acceleration sensor of the first earphone unit may detect a value exceeding a preset acceleration.

At this time, the processor 180_1 of the first earphone unit may determine that the first earphone unit is non-wearing state when the value detected by the acceleration sensor of the first earphone unit exceeds the preset acceleration.

As another example, as shown in FIG. 8, the user may detach the first earphone unit 101 from the body and bring it around the mouth while holding it in the hand 702. At this time, since the microphone 122_1 of the first earphone unit is located at one end of the body unit, it can be tilted for effective voice reception.

The gyro sensor of the first earphone unit 101 may detect an inclination of the first earphone unit 101 by measuring an angular velocity of the first earphone unit 101.

The processor 180_1 of the first earphone unit may determine that the first earphone unit is non-wearing state when the tilt value detected by the gyro sensor exceeds a preset value using the tilt value detected by the gyro sensor.

The above embodiments have been described according to the type of each sensor, but according to the embodiment, it will also be possible to detect the wearing state of the earphone unit by combining data acquired using at least one of a proximity sensor, an acceleration sensor, a motion sensor, a gyro sensor, and a conduction sensor.

Through the above embodiments, the processor 180_1 of the first earphone unit may set the first earphone unit to a microphone mode when it is determined that the first earphone unit is non-wearing state.

Accordingly, the second earphone unit 102 can be set to a voice reception mode.

Figure 9:
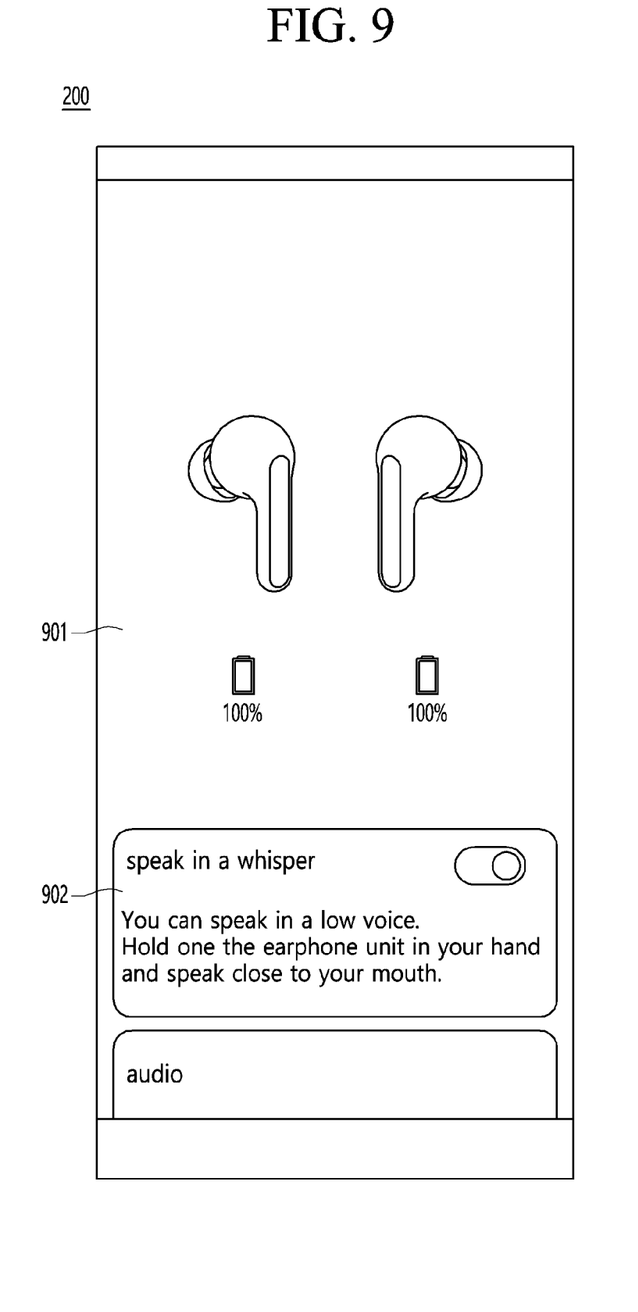
FIGS. 9 and 10 are diagrams illustrating a microphone use request through a terminal according to an embodiment of the present disclosure.
Figure 10:
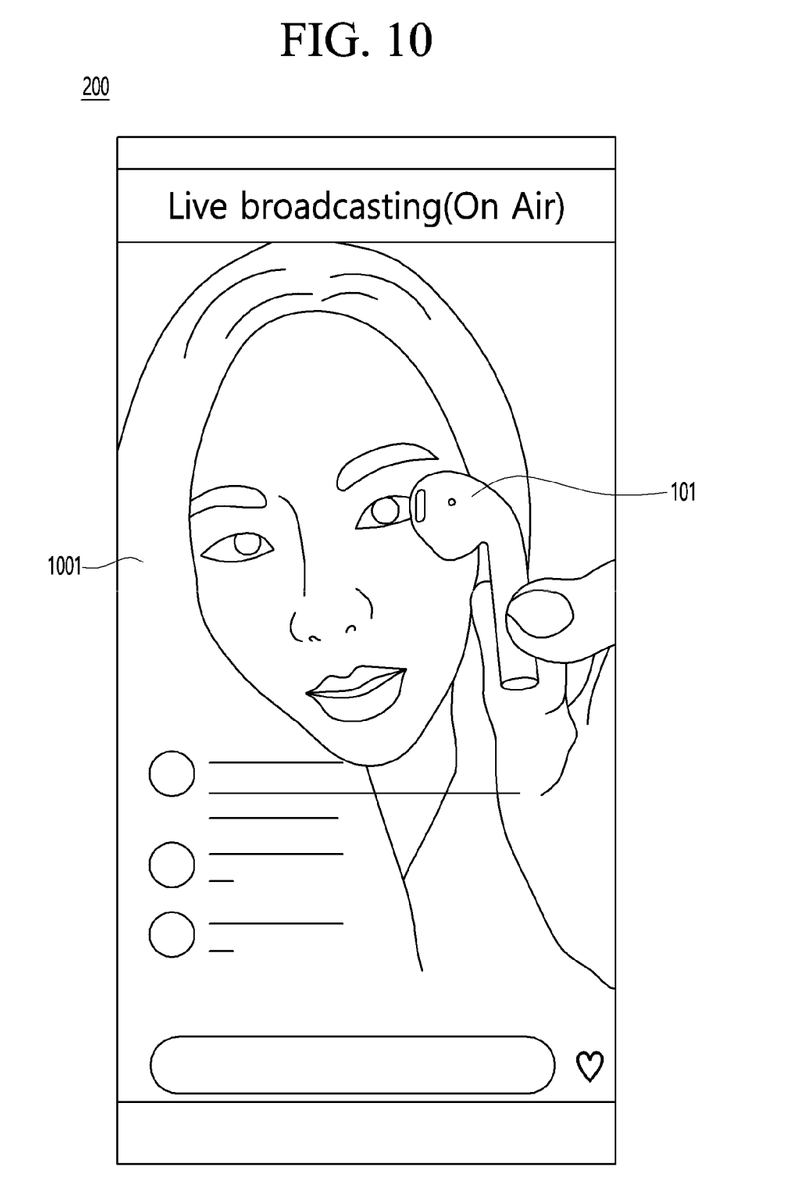

FIGS. 9 and 10 are diagrams for explaining an embodiment of requesting a microphone use request through the terminal according to FIG. 6.

Referring to FIG. 9, the user may transmit the microphone use request the to the portable audio device through the terminal 200.

Here, the microphone use request may include at least one of a change in application settings of the terminal, a request to activate the microphone in the application, and outgoing or receiving a call.

In detail, a user may activate the microphone use request by executing a specific application and changing settings of the application.

For example, a microphone use request screen 901 may be displayed on the display unit 251 of the terminal 200.

A microphone use request activation window 902 may be displayed on the microphone use request screen 901

The user can transmit the microphone use request to the portable audio device 100 by activating a button on the microphone use request activation window 902.

The portable audio device 100 may receive the microphone use request from the terminal 200 and set the microphone mode of the corresponding earphone unit according to the non-wearing state of the earphone unit.

According to an embodiment of the present disclosure, the microphone use request may be a microphone activation request in an application included in a terminal.

Specifically, the user may execute a specific application requesting permission to use the microphone. For example, referring to FIG. 10, the terminal 200 may execute a specific application 1001. In this case, the specific application 1001 may include an application that provides content in which an audio signal and a video signal are mixed, such as real-time broadcasting, video capturing, animated GIFs, and GIF image production.

When the portable audio device 100 and the terminal 200 are connected, the terminal 200 may transmit the microphone use request to the portable audio device when a specific application 1001 is executed.

The portable audio device 100 may receive a microphone activation request from the terminal 200 according to the execution of the specific application 1001 of the terminal 200. Each of the plurality of earphone units included in the portable audio device may determine whether the earphone unit is worn.

Among them, when the non-wearing state of the first earphone unit 101 is detected, the processor 180_1 of the first earphone unit may set the first earphone unit 101 to a microphone mode.

Referring to FIG. 10 according to an embodiment of the present disclosure, the user holds the first earphone unit 101 in a hand so that the first earphone unit 101 is in the non-wearing state, and the terminal 200 may perform operation requested by a specific application 100_1 using audio data input from the microphone 122_1 of the first earphone unit.

According to an embodiment of the present disclosure, the microphone use request be a call outgoing or a call reception of a terminal.

In detail, a call may be started through the terminal 200. The processor 280 of the terminal may transmit the microphone use request to the portable audio device 100 when an outgoing or receiving sound for a call is recognized.

Here, the microphone use request may mean activating a microphone setting function of the portable audio device in order to transmit a voice input through the microphone of the portable audio device 100 to another terminal communicating with the terminal.

Meanwhile, the microphone use request may include a case where a motion of a predetermined type is detected through a sensor (acceleration sensor, gyro sensor, etc.) for determining the motion of the terminal 200.

In addition, it may be transmitted to portable audio device 100 in various cases, such as when a specific key button is operated on the terminal 200, when a characteristic voice is recognized through the microphone 222 of the terminal, and when the user's face is recognized through the camera 221 of the terminal.

Meanwhile, when the microphone of the first earphone unit is activated according to the request of the terminal 200 to use the microphone, the portable audio device 100 may output a notification notifying the user that the microphone of the first earphone unit is activated.

Meanwhile, according to an embodiment of the present disclosure, the audio system 1 including the terminal 200 and the portable audio device 100, and in a system including a portable audio device including a first earphone unit and a second earphone unit and the terminal, the terminal transmits and receives an audio signal by communicating with a portable audio device, and the portable audio device sets the first earphone to a microphone mode when the non-wearing state of the first earphone is detected and sets the second earphone unit to a voice reception mode.

In addition, the portable audio device may determine that the first earphone unit is in the non-wearing state when detecting that the information obtained through the proximity sensor of the first earphone unit deviate from a preset distance.

In addition, the portable audio device may determine that the first earphone unit is in non-wearing state when a gesture corresponding to the reception of a voice signal through the first earphone unit is detected through a motion sensor of the first earphone unit.

In addition, the portable audio device may set the first earphone unit to a microphone mode when the first earphone unit is in the wearing state for a predetermined period of time or longer and the first earphone unit is not in a charging state.

The terminal requests a microphone use to the portable audio device, and the microphone use request requested by the terminal may include at least one of a change in application settings of the terminal, a request to activate a microphone in an application, and outgoing and receiving a call.

In addition, in the operating method of a portable audio device including a first earphone unit and a second earphone unit, the method comprises: receiving an audio signal from a terminal, detecting a non-wearing state of the first earphone unit, and setting the first earphone unit to a microphone mode and setting the second earphone unit to a voice reception mode.

The step of detecting the non-wearing state of the first earphone unit may include detecting that information acquired through a proximity sensor of the first earphone unit deviate from a preset distance or detecting a gesture corresponding to receiving a voice signal through the earphone unit through a motion sensor of the first earphone unit. In addition, after the step of detecting the non-wearing state of the first earphone unit, if the first earphone unit is not in a charging state, it may be possible to further include setting the first earphone unit to a microphone mode.

In addition, although services and embodiments have been described above, these are merely examples and do not limit the present invention, and those skilled in the art to which the present invention belongs to the scope that does not deviate from the essential characteristics of the present services and embodiments. It will be appreciated that various modifications and applications not exemplified above are possible. For example, each component specifically shown in the embodiments can be modified and implemented. And differences related to these variations and applications should be construed as being included in the scope of the present invention as defined in the appended claims.

The invention claimed is:

1. A portable audio device including a first earphone unit and a second earphone unit,
   wherein the first earphone unit comprises:
   a communication unit;
   an audio output unit configured to output an audio signal received through the communication unit;
   a microphone;
   a sensor unit configured to detect a wearing state of the first earphone unit; and
   a processor configured to set the first earphone unit to a microphone mode when the first earphone unit is detected as a non-wearing state, and
   wherein the processor determines that the first earphone unit is in the non-wearing state when at least one of the first earphone unit moves in excess of a preset acceleration or the first earphone unit is inclined more than a predetermined degree.

2. The portable audio device of claim 1, wherein the second earphone unit comprises:
   a communication unit;
   an audio output unit configured to output an audio signal received through the communication unit;
   a microphone; and
   a processor configured to set the first earphone unit to a voice reception mode when the first earphone unit is set the microphone mode.

3. The portable audio device of claim 1, wherein the microphone mode includes a mode for controlling turning on the microphone of the first earphone unit.

4. The portable audio device of claim 3, wherein the microphone mode is a mode further including controlling turning off the audio output unit of the first earphone unit.

5. The portable audio device of claim 3, wherein the sensor unit of the first earphone unit detects the wearing state using at least one of a proximity sensor, an acceleration sensor, a motion sensor, a gyro sensor, or a conduction sensor.

6. The portable audio device of claim 1, wherein the sensor unit of the first earphone unit includes a proximity sensor and the processor of the first earphone unit, when it is detected that information obtained through the proximity sensor of the first earphone unit deviated from a preset distance, determines that the first earphone unit is in the non-wearing state.

7. The portable audio device of claim 1, wherein the sensor unit of the first earphone unit includes a motion sensor and the processor of the first earphone unit, when a gesture corresponding to a reception of a voice signal through the first earphone unit is detected through the motion sensor of the first earphone unit, determines that the first earphone unit is the non-wearing state.

8. The portable audio device of claim 1, wherein, the processor of the first earphone unit, sets the first earphone unit to the microphone mode when the non-wearing state of the first earphone unit is maintained for a predetermined time or longer.

9. The portable audio device of claim 8, wherein the processor of the first earphone unit, when the non-wearing state of the first earphone unit is maintained for the predetermined time or longer and the first earphone unit is not in a charging state, sets the first earphone unit to the microphone mode.

10. The portable audio device of claim 1, wherein the communication unit of the first earphone unit and a communication unit of the second earphone unit communicate with a terminal, and
the processor of the first earphone unit, when a microphone use request is received from the terminal, sets the first earphone unit to the microphone mode.

11. The portable audio device of claim 10, wherein the microphone use request requested from the terminal includes at least one of changing application settings of the terminal, requesting microphone activation in an application, outgoing a call, and receiving a call.

12. The portable audio device of claim 1, wherein the processor of the first earphone unit transmits an audio signal input through the microphone of the first earphone unit to a terminal, and
a processor of the second earphone unit outputs an audio signal received from the terminal using an audio output unit of the second earphone unit.

13. A system including a portable audio device including a first earphone unit, a second earphone unit and a terminal,
wherein the terminal communicates with the portable audio device to transmit and receive an audio signal,
wherein the portable audio device, when a non-wearing state of the first earphone unit is detected, sets the first earphone unit to a microphone mode and sets the second earphone unit to a voice reception mode, and
wherein the portable audio device determines that the first earphone unit is in the non-wearing state when at least one of the first earphone unit moves in excess of a preset acceleration or the first earphone unit is inclined more than a predetermined degree.

14. The system of claim 13, wherein the portable audio device, when it is detected that information obtained through a proximity sensor of the first earphone unit deviated from a preset distance, determines that the first earphone unit is in the non-wearing state.

15. The system of claim 13, wherein the portable audio device, when a gesture corresponding to a reception of a voice signal through the first earphone unit is detected through a motion sensor of the first earphone unit, determines that the first earphone unit is in the non-wearing state.

16. The system of claim 13, wherein the portable audio device sets the first earphone unit to the microphone mode when the non-wearing state of the first earphone unit is maintained for a predetermined time or longer and the first earphone unit is not in a charging state.

17. The system of claim 13, wherein the terminal requests a microphone use request to the portable audio device to microphone, and
the microphone use request requested from the terminal includes at least one of changing application settings of the terminal, requesting microphone activation in an application, outgoing a call, and receiving a call.

18. A method of operating a portable audio device including a first earphone unit and a second earphone unit, comprising:
receiving an audio signal from a terminal;
detecting a non-wearing state of the first earphone unit;
setting the first earphone unit to a microphone mode; and
setting the second earphone unit to a voice reception mode,
wherein the detecting the non-wearing state of the first earphone unit comprises:
detecting that the first earphone unit is in the non-wearing state when at least one of the first earphone unit moves in excess of a preset acceleration or the first earphone unit is inclined more than a predetermined degree.

19. The method of claim 18, wherein the detecting the non-wearing state of the first earphone unit comprises:
detecting that information obtained through a proximity sensor of the first earphone unit deviate from a predetermined distance, or
detecting a gesture corresponding to receiving a voice signal through the first earphone unit through a motion sensor of the first earphone unit.

20. The method of claim 19, further comprising:
after detecting the non-wearing state of the first earphone unit, when the first earphone unit is not in a charging state, setting the first earphone unit to the microphone mode.

* * * * *